(12) United States Patent
Trost

(10) Patent No.: US 9,243,704 B2
(45) Date of Patent: Jan. 26, 2016

(54) DRIVE AXLE ASSEMBLY WITH A COLLAR ACTUATOR MECHANISM

(71) Applicant: ArvinMeritor Technology, LLC, Troy, MI (US)

(72) Inventor: Harry Trost, Royal Oak, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 109 days.

(21) Appl. No.: 14/169,425

(22) Filed: Jan. 31, 2014

(65) Prior Publication Data

US 2015/0219197 A1 Aug. 6, 2015

(51) Int. Cl.
| | |
|---|---|
| F16H 48/30 | (2012.01) |
| F16H 48/34 | (2012.01) |
| F16H 48/20 | (2012.01) |
| B60K 17/346 | (2006.01) |
| B60K 17/348 | (2006.01) |
| F16H 48/00 | (2012.01) |

(52) U.S. Cl.
CPC .............. *F16H 48/34* (2013.01); *B60K 17/346* (2013.01); *B60K 17/348* (2013.01); *B60K 17/3462* (2013.01); *F16H 48/20* (2013.01); *F16H 2048/02* (2013.01); *F16H 2048/04* (2013.01)

(58) Field of Classification Search
CPC .................................. F16H 48/34; F16H 48/20
See application file for complete search history.

(56) References Cited

U.S. PATENT DOCUMENTS

| | | | |
|---|---|---|---|
| 4,987,788 A * | 1/1991 | Bausch .................... 74/89.34 |
| 5,030,181 A | 7/1991 | Keller | |
| 5,409,429 A * | 4/1995 | Showalter et al. ............ 475/295 |
| 5,465,819 A * | 11/1995 | Weilant et al. ................... 192/35 |
| 5,499,951 A * | 3/1996 | Showalter .................... 475/204 |
| 5,545,103 A * | 8/1996 | Gustin .......................... 475/223 |
| 5,704,444 A * | 1/1998 | Showalter .................... 180/247 |
| 5,915,513 A * | 6/1999 | Isley et al. ....................... 192/35 |
| 5,950,750 A * | 9/1999 | Dong et al. ................. 180/24.09 |
| 6,019,694 A | 2/2000 | Forrest et al. | |
| 6,083,134 A | 7/2000 | Godlew | |
| 6,302,251 B1 * | 10/2001 | Fair et al. ......................... 192/35 |
| 6,551,209 B2 | 4/2003 | Cheadle et al. | |
| 6,958,030 B2 | 10/2005 | DeGowske | |
| 7,093,681 B2 * | 8/2006 | Strain .......................... 180/14.2 |
| 7,137,921 B2 | 11/2006 | DeGowske | |
| 8,348,801 B2 | 1/2013 | Pontanari et al. | |
| 8,622,868 B2 | 1/2014 | Pontanari et al. | |
| 8,651,994 B2 * | 2/2014 | Bassi et al. ..................... 475/221 |
| 2005/0026734 A1* | 2/2005 | Ziech et al. .................... 475/246 |
| 2006/0276297 A1* | 12/2006 | Ziech ............................. 475/221 |
| 2008/0042791 A1 | 2/2008 | York et al. | |

FOREIGN PATENT DOCUMENTS

EP 2617596 A1 7/2013

OTHER PUBLICATIONS

European Patent Office, Extended European Search Report for the corresponding European Patent Application No. 14199304.8 mailed Jun. 11, 2015.

* cited by examiner

*Primary Examiner* — David J Hlavka
(74) *Attorney, Agent, or Firm* — Brooks Kushman P.C.

(57) ABSTRACT

A drive axle assembly having a collar actuator mechanism that may include an electromagnetic coil. The electromagnetic coil may be disposed in a stationary position with respect to a housing and may be configured to actuate the collar.

20 Claims, 4 Drawing Sheets

DRIVE AXLE ASSEMBLY WITH A COLLAR ACTUATOR MECHANISM

TECHNICAL FIELD

This application relates to a drive axle assembly having a collar actuator mechanism.

BACKGROUND

An electromagnetic locking differential assembly is disclosed in U.S. Pat. No. 6,958,030.

SUMMARY

In at least one embodiment, a drive axle assembly may be provided. The drive axle assembly may include a housing, an input shaft, a first gear, a collar, and a collar actuator mechanism. The input shaft may be disposed in the housing and may be configured to rotate about an axis. The first gear may be disposed proximate the input shaft. The collar may be disposed proximate the first gear. The collar actuator mechanism may include an electromagnetic coil that may be disposed in a stationary position with respect to the housing. The electromagnetic coil may be configured to actuate the collar between a first position in which the collar is disengaged from the first gear and a second position in which the collar engages the first gear.

In at least one embodiment, a drive axle assembly may be provided. The drive axle assembly may include a housing, an input shaft, a first gear, a collar, and a collar actuator mechanism. The input shaft may be disposed in the housing and may be configured to rotate about a first axis. The interaxle differential unit may be disposed on the input shaft. The first gear may be rotatably disposed on the input shaft and may be operatively coupled to the interaxle differential unit. The collar may be moveably disposed on the input shaft. The collar actuator mechanism may include an electromagnetic coil and a biasing member. The electromagnetic coil may be disposed in a stationary position on the housing. The biasing member may exert a biasing force that biases the collar away from the first gear. The electromagnetic coil may be configured to actuate the collar between a first position in which the collar is disengaged from the first gear and a second position in which the collar engages the first gear such that torque is transmitted from the input shaft to the first gear via the collar.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
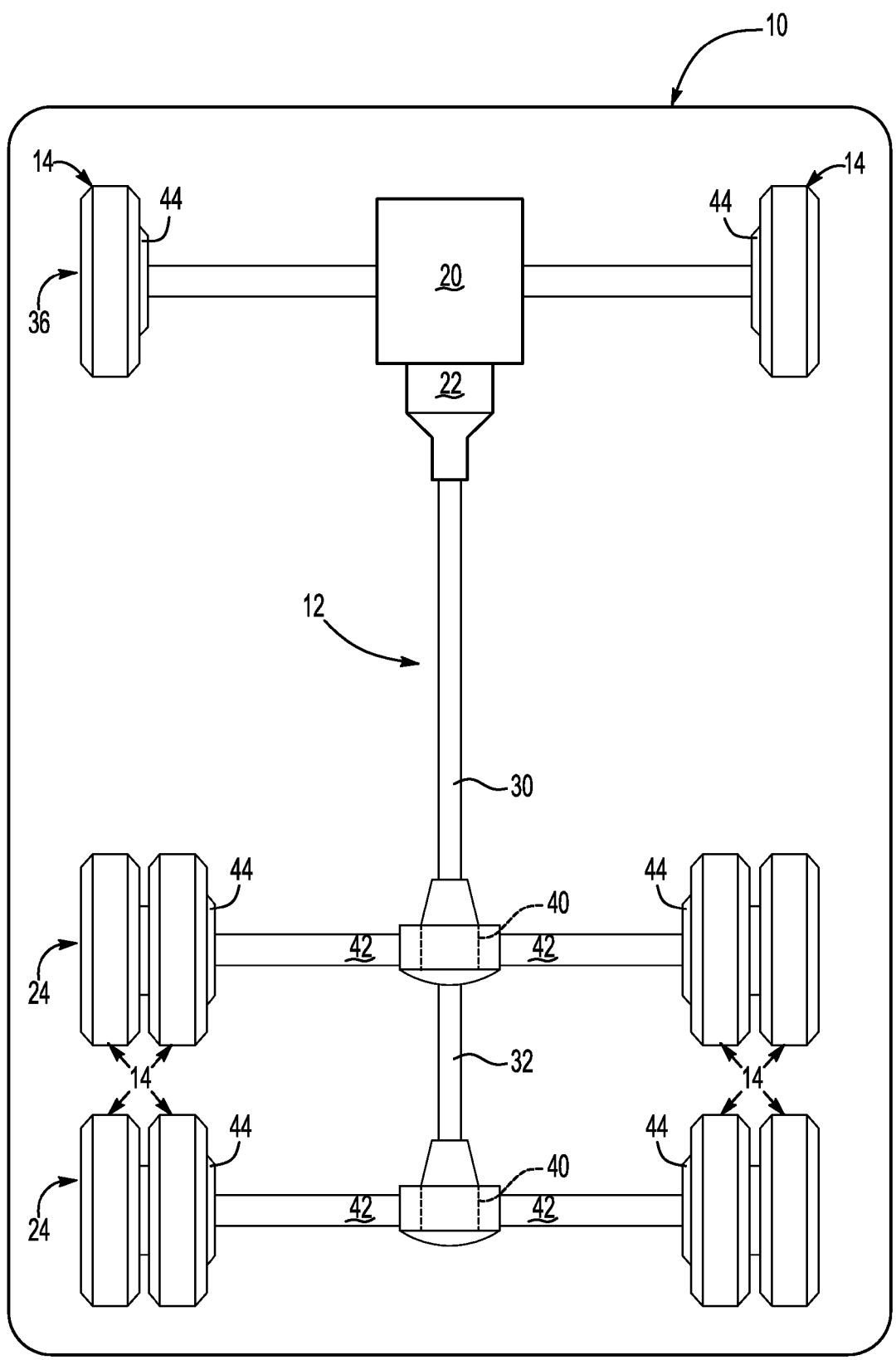
FIG. 1 is a schematic of an exemplary vehicle having an axle assembly.

Referring to FIG. 1, an exemplary vehicle 10 is shown. The vehicle 10 may be a motor vehicle like a truck, farm equipment, or military transport or weaponry vehicle. The vehicle 10 may include a trailer for transporting cargo in one or more embodiments.

The vehicle 10 may have a drivetrain 12 that may provide torque to one or more wheel assemblies 14 to propel the vehicle 10. The drivetrain 12 may have a hybrid configuration that may employ multiple power sources or a non-hybrid configuration. In a non-hybrid configuration, the drivetrain 12 may include an engine 20, a transmission 22, and at least one drive axle assembly 24.

The engine 20 may provide power that may be used to rotate one or more wheel assemblies 14. For example, the vehicle 10 may have a set of wheel assemblies 14 that may include a tire mounted on a wheel. In at least one embodiment, the engine 20 may be configured as an internal combustion engine that may be adapted to combust any suitable type of fuel, such as gasoline, diesel fuel, or hydrogen.

The transmission 22 may be coupled to or may be driven by the engine 20. The transmission 22 may be of any suitable type, such as a multi-gear "step ratio" transmission as is known by those skilled in the art.

A drive axle assembly 24 may rotatably support one or more wheel assemblies 14. In FIG. 1, first and second drive axle assemblies 24 are shown in a tandem axle configuration, although it is contemplated that a greater or lesser number of drive axle assemblies 24 may be provided. In a tandem configuration, the drive axle assemblies 24 may be connected in series and may be designated as a forward-rear drive axle assembly and a rear-rear drive axle assembly. An output of the transmission 22 may be coupled to an input of the forward-rear axle assembly 24 with a drive shaft 30. An output of the forward-rear drive axle assembly 24 may be selectively coupled to an input of the rear-rear drive axle assembly 24, if provided, via a prop shaft 32.

The vehicle 10 may also include a front axle assembly 36 that may be configured to steer the vehicle 10. The front axle assembly 36 may or may not be configured as a drive axle that provides torque to at least one associated wheel assembly 14.

One or more drive axle assemblies 24 may have a differential 40. The differential 40 may receive torque from the engine 20 and transmission 22 and may transmit torque to a wheel assembly 14 via an associated axle 42. Each axle 42 may interconnect the differential 40 to at least one associated wheel hub assembly 44. In FIG. 1, two axles 42 are shown that extend from opposite sides of the differential 40. Each axle 42 may be coupled to an output of the differential 40 at a first end and may be coupled to a corresponding wheel hub assembly 44 at a second end. The wheel hub assembly 44 may facilitate coupling of a wheel assembly 14 to an axle 42. For example, a wheel assembly 14 may be mounted on and may rotate with the wheel hub assembly 44.

Figure 2:
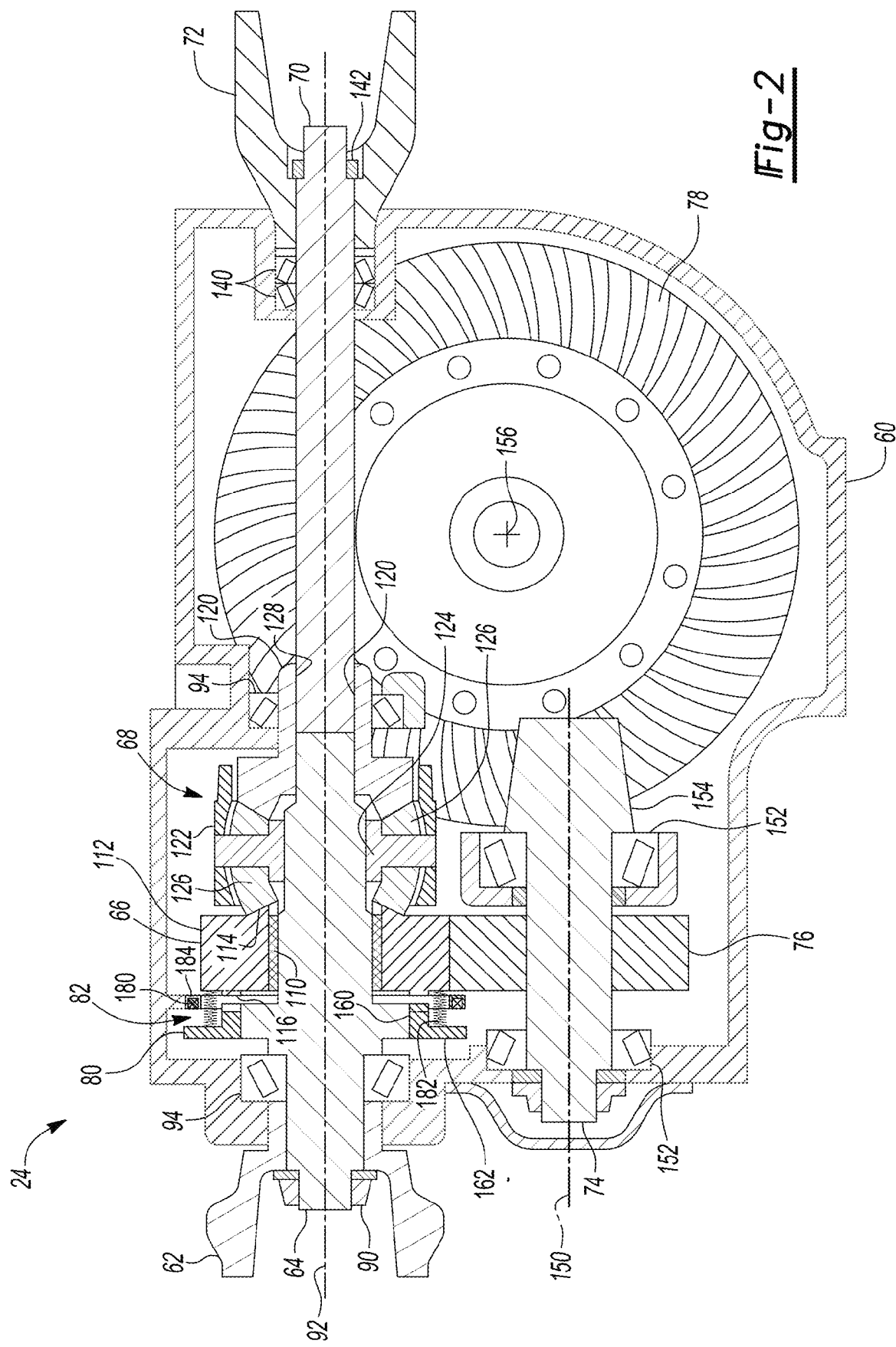
FIG. 2 is a cross section of the axle assembly showing a collar in a first position.

Referring to FIG. 2, a portion of an exemplary drive axle assembly 24 is shown in more detail. The drive axle assembly 24 may be configured to provide torque to its associated wheel assemblies 14 via its axles 42 and/or to selectively provide torque to another axle assembly 24 that may be connected in series. In at least one embodiment, the drive axle assembly 24 may include a housing 60, an input yoke 62, an input shaft 64, a first gear 66, an interaxle differential unit 68, an output shaft 70, an output yoke 72, a pinion 74, a second gear 76, a ring gear 78, a collar 80, and a collar actuator mechanism 82. In FIG. 2, the collar 80 and collar actuator mechanism 82 are associated with the interaxle differential unit 68, which may operatively connect multiple drive axle assemblies 24. Alternatively or in addition, the collar 80 and collar actuator mechanism 82 may be associated with the differential 40. For instance, the collar 80 and collar actuator mechanism 82 may be associated with an input or input shaft that provides torque to the differential 40 and/or an output or output shaft of the differential 40 to control or alter the torque that may be provided to an axle 42 and an associated wheel assembly 14. For instance, the collar 80 and collar actuator mechanism 82 may be provided as part of a differential lock that may be configured to inhibit different axles 42 from rotating at different speeds or permit different axles 42 of the drive axle assembly 24 to rotate at different speeds.

The housing 60 may receive various components of the drive axle assembly 24. In addition, the housing 60 may facilitate mounting of the drive axle assembly 24 to the vehicle 10.

The input yoke 62 may facilitate coupling of the drive axle assembly 24 to the drive shaft 30. The input yoke 62 may be coupled to the drive shaft 30 in any suitable manner, such as with a universal joint. The input yoke 62 may also be fixedly coupled to the input shaft 64. For instance, the input yoke 62 may include a center bore that may receive an end portion of the input shaft 64. The center bore and the input shaft 64 may be provided with mating splines that may help align and secure the input yoke 62 to the input shaft 64. A fastener 90, such as a nut, may be threaded onto an end of the input shaft 64 to further secure and inhibit removal of the input yoke 62 from the input shaft 64.

Figure 4:
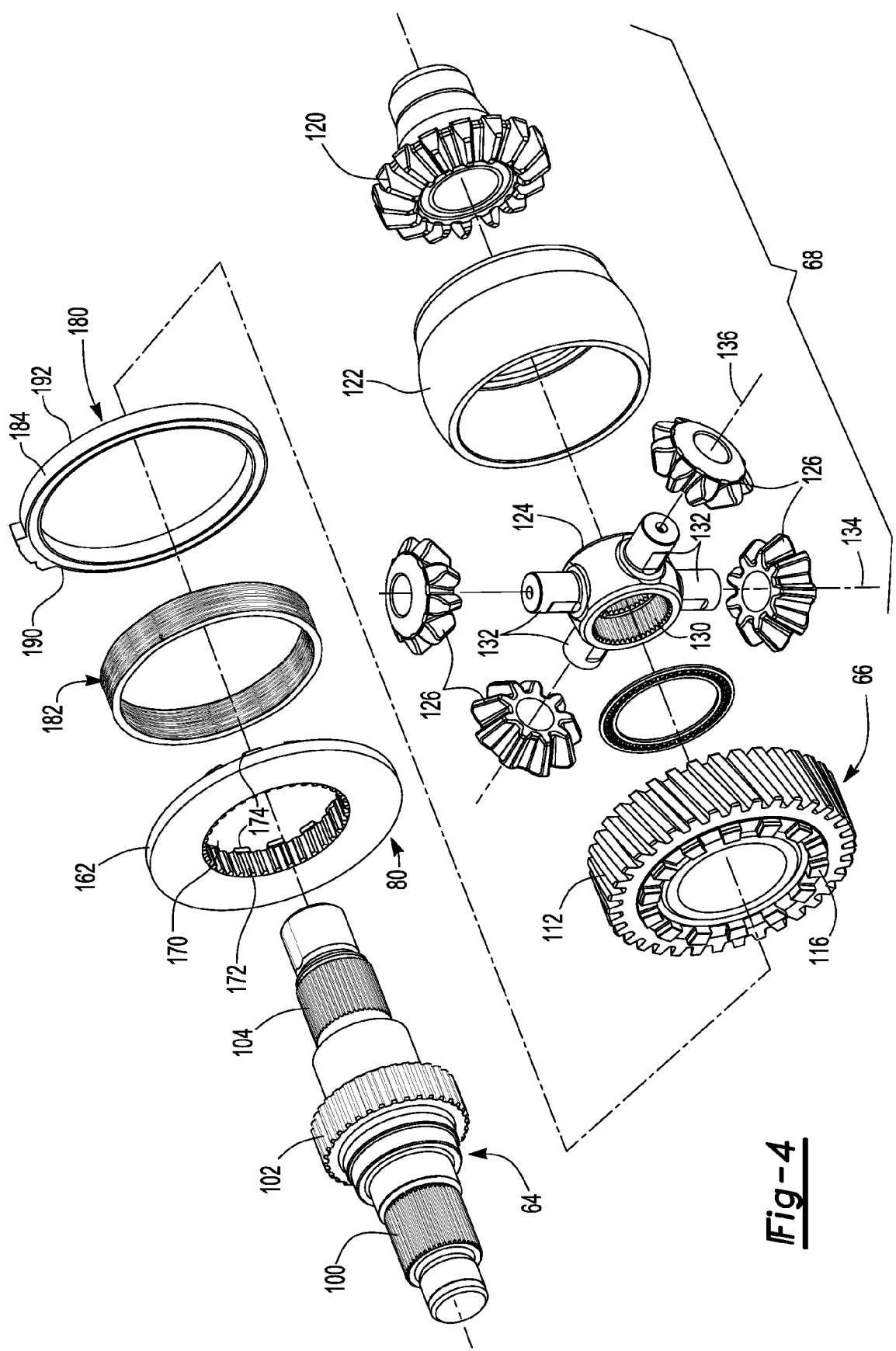
FIG. 4 is an exploded view of a portion of the axle assembly.

The input shaft 64 may be configured to rotate about a first axis 92. For instance, the input shaft 64 may be supported by one or more bearings 94 that may be disposed in the housing 60. The bearings 94 may cooperate to facilitate rotation of the input shaft 64 while inhibiting axial movement of the input shaft 64 along the first axis 92. The input shaft 64 may be located above the pinion 74. As is best shown in FIG. 4, the input shaft 64 may include one or more splines, such as a first spline 100, a second spline 102, and a third spline 104. The first spline 100 may mate with a corresponding spline on the input yoke 62. The second spline 102 may mate with a corresponding spline on the collar 80. The third spline 104 may mate with a corresponding spline on a spider of the interaxle differential unit 68.

Referring to FIGS. 2 and 4, the first gear 66, which may also be called a drive gear, may be disposed proximate the input shaft 64. In at least one embodiment, the first gear 66 may have a center bore that may receive a bearing 110 that may be disposed on the input shaft 64 and that may rotatably support the first gear 66. As such, the bearing 110 may allow the first gear 66 to rotate about the input shaft 64 or with respect to the input shaft 64 under certain operating conditions as will be discussed in more detail below. The first gear 66 may include a first gear portion 112, a second gear portion 114, and a third gear portion 116.

The first gear portion 112 may be configured to engage the second gear 76. For example, the first gear portion 112 may include a plurality of teeth that may be arranged around an outside diameter of the first gear 66.

The second gear portion 114 may be operatively coupled to the interaxle differential unit 68. For instance, the second gear portion 114 may include a set of teeth that may be arranged on a side or face of the first gear 66 that may face toward the interaxle differential unit 68.

The third gear portion 116 may be disposed on an opposite side of the first gear 66 from the second gear portion 114. The third gear portion 116 may include a set of teeth that may be arranged on a side or face of the first gear 66 that faces toward the collar 80. For convenience in reference, the third gear portion 116 may also be referred to as a face gear portion 116.

The interaxle differential unit 68 may be disposed in the housing 60 proximate the input shaft 64. The interaxle differential unit 68 may be configured to compensate for speed differences between different drive axle assemblies 24. The interaxle differential unit 68 may include an output gear 120, a case 122, a spider 124, and a plurality of pinion gears 126.

The output gear 120 may be disposed proximate an exterior surface of the input shaft 64 and/or the output shaft 70. For example, the output gear 120 may extend along the first axis 92 and may have a center bore. A portion of the center bore may receive and/or support an end of the input shaft 64 and/or the output shaft 70. In various embodiments, an end of the input shaft 64 may be disposed in the center bore and optionally a bearing may be provided between the input shaft 64 and center bore to facilitate alignment and rotation. The center bore may also include a spline 128 that may be spaced apart from the input shaft 64 and that may receive and engage a corresponding spline on the output shaft 70. The output gear 120 may include a plurality of teeth that may be arranged on a side or face of the output gear 120 that faces toward the spider 124 and may mate with corresponding teeth on one or more pinion gears 126.

The case 122 may receive various components of the interaxle differential unit 68. The case 122 may be spaced apart from the housing 60, the first gear 66, and the output gear 120 to facilitate rotation with respect to these components.

The spider 124 may be generally disposed in the case 122 and may be fixedly disposed on the input shaft 64. For instance, the spider 124 may include a center bore that may have a spline 130 that mates with the third spline 104 on the input shaft 64 to help align and secure the spider 124 to the input shaft 64. As such, the spider 124 may rotate about the first axis 92 with the input shaft 64. The spider 124 may also include a set of pins 132. The pins 132 may extend away from the center bore and may be arranged along a first spider axis 134 and a second spider axis 136. The first spider axis 134 and the second spider axis 136 may intersect and may be disposed substantially perpendicular to each other and substantially perpendicular to the first axis 92. Ends of the pins 132 may be received by the case 122 and may be spaced apart from the housing 60 so as not to interfere with rotation of the interaxle differential unit 68.

A pinion gear 126 may be rotatably disposed on each pin 132. Each pinion gear 126 may be generally disposed in the case 122 and may be retained on a corresponding pin 132 by the case 122 or with a fastener like a thrust washer that may engage the case 122. In the embodiment shown, two pinion gears 126 may rotate about pins 132 that extend along the first spider axis 134 and two pinion gears 126 may rotate about pins 132 that extend along the second spider axis 136. Each pinion gear 126 may include a set of teeth that mate with the second gear portion 114 of the first gear 66 and that mate with the output gear 120.

Referring to FIG. 2, the output shaft 70 may extend along and may be configured to rotate about the first axis 92. For instance, the output shaft 70 may be supported by one or more bearings 140 that may be disposed on the housing 60. The bearings 140 may facilitate rotation of the output shaft 70 while inhibiting axial movement along the first axis 92. The output shaft 70 may be fixedly coupled to the output gear 120. For instance, the output shaft 70 may include a spline disposed along an exterior surface that may be configured to engage and mate with the teeth of a spline in the center bore of the output gear 120.

The output yoke 72 may facilitate coupling of the drive axle assembly 24 to the prop shaft 32. The output yoke 72 may be coupled to the prop shaft 32 in any suitable manner, such as with a universal joint. The output yoke 72 may be fixedly coupled to the output shaft 70. For instance, the output yoke 72 may include a center bore that may receive an end of the output shaft 70. The center bore and the output shaft 70 may be provided with mating splines that may help align and secure the output yoke 72 to the output shaft 70. A fastener 142, such as a nut, may be threaded onto an end of the output shaft 70 to further secure and inhibit removal of the output yoke 72 from the output shaft 70.

The pinion 74 may be spaced apart from the input shaft 64 and may be configured to rotate about a second axis 150. For instance, the pinion 74 may be supported by one or more bearings 152 that may be disposed in the housing 60. The bearings 152 may facilitate rotation of the pinion 74 while inhibiting axial movement of the pinion 74 along the second axis 150. In at least one embodiment, the first and second axes 92, 150 may be spaced apart and extend substantially parallel to each other. A pinion gear 154 may be disposed at an end of the pinion 74. The pinion gear 154 may be integrally formed with the pinion 74 and may include a set of teeth that mate with corresponding teeth on one or more ring gears 78. The ring gear 78 may be configured to rotate about a third axis 156 and may be coupled to an axle 42 of the drive axle assembly 24. The pinion 74 and/or second axis 150 may be positioned below the third axis 156. Moreover, the input shaft 64, the first gear 66, the output shaft 70 and other components disposed along the first axis 92 may be positioned above the pinion 74 and the second and third axes 150, 156 in one or more embodiments. This "high entry" configuration may position these components above lubricant that may accumulate in the bottom of the housing 60, thereby reducing or avoiding frictional drag with the lubricant that may otherwise reduce operational efficiency of the drive axle assembly 24.

The second gear 76 may be disposed proximate the pinion 74. The second gear 76 may include a plurality of teeth that may be generally arranged about an outside diameter of the second gear 76 that mate with the first gear portion 112 of the first gear 66.

Referring to FIGS. 2 and 4, the collar 80 may be moveably disposed on the input shaft 64. In at least one embodiment, the collar 80 may be disposed between the housing 60 and the first gear 66 or between the input yoke 62 and the first gear 66. The collar 80 may be generally ring-shaped and may extend continuously around the input shaft 64. In at least one embodiment, the collar 80 may include a body portion 160 and a flange portion 162.

The body portion 160 may define a hole 170 that may receive the input shaft 64. A spline 172 may be provided in the hole 170 and/or may at least partially define the hole 170. The spline 172 may mate with the second spline 102 of the input shaft 64 and may permit axial movement of the collar 80 along the input shaft 64 while inhibiting rotational movement of the collar 80 with respect to the input shaft 64.

The body portion 160 may also include a collar face gear 174. The collar face gear 174 may include a set of teeth that may be arranged on a first end of the body portion 160 that may face toward the first gear 66 and that may be disposed opposite the flange portion 162. The collar face gear 174 may selectively engage the third gear portion 116 of the first gear 66. More specifically, the collar face gear 174 may be spaced apart from the third gear portion 116 when the collar 80 is in a first position and may engage the third gear portion 116 when the collar 80 is in a second position. In the first position, the collar 80 may be disengaged from the first gear 66 and the first gear 66 and the input shaft 64 may not rotate together about the first axis 92. More specifically, the disconnection between the collar 80 and the first gear 66 may allow the first gear 66 to rotate with respect to the input shaft 64 or at a different rotational velocity than the input shaft 64. In the second position, the collar 80 may engage the first gear 66 and the input shaft 64 and the first gear 66 may rotate together about the first axis 92. More specifically, the engagement of the collar face gear 174 and the third gear portion 116 may inhibit rotation of the first gear 66 with respect to the collar 80 and with respect to the input shaft 64 due to the mating splines between the input shaft 64 and the collar 80. As such, torque may be transmitted from the input shaft 64 to the first gear 66 via the collar 80 when the collar 80 is in the second position.

The flange portion 162 may extend radially from the body portion 160. As such, the flange portion may extend further from the first axis 92 than the body portion 160 in one or more embodiments. The flange portion 162 may be ferromagnetic and may be disposed at an end of the collar 80.

The collar actuator mechanism 82 may actuate or facilitate positioning of the collar 80. Moreover, the collar actuator mechanism 82 may replace mechanical components such as a mechanical actuator, push rod, shift fork, and associated return spring to reduce cost and weight. In at least one embodiment, the collar actuator mechanism 82 may include an electromagnetic coil 180 and a biasing member 182.

The electromagnetic coil 180 may be configured to actuate the collar 80 between the first position and the second position. The electromagnetic coil 180 may be fixedly disposed in the housing 60. More specifically, the electromagnetic coil 180 may be disposed in a stationary position with respect to the housing 60. The electromagnetic coil 180 may be secured or fixed to the housing 60 or a component that is stationary with respect to the housing 60 in any suitable manner, such as with a bracket, a mounting feature that may be provided with the housing 60, one or more fasteners, and/or with an adhesive or other bonding technique.

The electromagnetic coil 180 may be configured as a ring that may extend continuously around the input shaft 64 and the first axis 92. The electromagnetic coil 180 may be disposed between the first gear 66 and the collar 80. The electromagnetic coil 180 may be electrically connected to an electrical power source (not shown). The electromagnetic coil 180 may be energized and may generate a magnetic field that may exert a magnetic attractive force when the current is provided to the electromagnetic coil 180. The magnetic attractive force may attract the flange portion 162 and actuate or pull the collar 80 toward the electromagnetic coil 180. More specifically, the electromagnetic coil 180 may exert a magnetic attractive force that may overcome the biasing force exerted by the biasing member 182 to actuate the collar 80 from the first position to the second position when sufficient current is provided. The collar 80 may be spaced apart from the electromagnetic coil 180 when the collar 80 is in the second position. The actuation force exerted by the electromagnetic coil 180 may be based on the number of windings and/or current provided.

The electromagnetic coil 180 may be received in a coil housing 184. The coil housing 184 may be attached to the housing 60 or a component that may be stationary with respect to the housing 60 and may be non-ferromagnetic. As such, the coil housing 184 may not magnetically attract debris or contaminants located inside the drive axle assembly 24 and may inhibit magnetization of the housing 60 in one or more embodiments.

Figure 3:
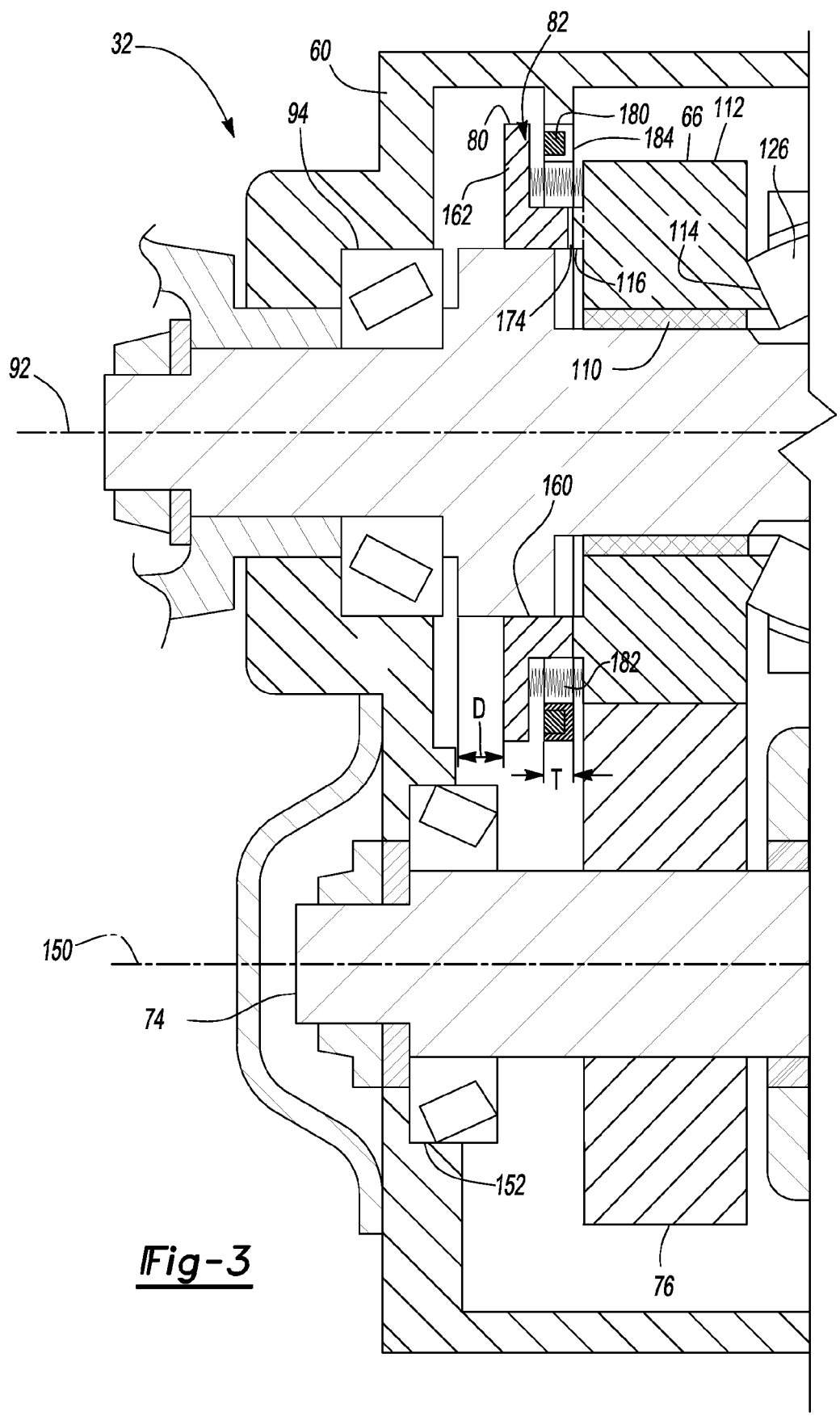
FIG. 3 is a cross section of the axle assembly showing the collar in a second position.

The electromagnetic coil 180 may have a first surface 190 and a second surface 192. The first surface 190 may face toward the collar 80. The second surface 192 may be disposed opposite the first surface 190. The electromagnetic coil 180 may have a thickness that is designated T in FIG. 3. The thickness T may be measured from the first surface 190 to the second surface 192. The thickness T of electromagnetic coil when a may be less than a distance of travel of the collar 80 from the first position to the second position, which is designated D in FIG. 3. The travel distance may be greater than the thickness of the coil. Moreover, the collar 80 may not engage the electromagnetic coil 180 when in the first position or the second position. For instance, the collar 80 may be spaced apart from the electromagnetic coil 180 by around 13 mm when in the first position and may be spaced apart from the electromagnetic coil 180 by about 3 mm when in the second position. As such, the electromagnetic coil may not exert a frictional drag torque upon the collar 80 and the collar 80 may not engage or damage the electromagnetic coil 180 on one or more embodiments.

The biasing member 182 may exert a biasing force on the collar 80. More specifically, the biasing member 182 may exert a biasing force that biases the collar 80 away from the electromagnetic coil 180 and from the second position to the first position when the electromagnetic coil 180 is not sufficiently energized. The biasing member 182 may be configured as a ring and may extend continuously around the collar 80 and/or the collar face gear 174. As such, the biasing member 182 may be radially disposed between the input shaft 64 and the electromagnetic coil 180, between the collar face gear 174 and the electromagnetic coil 180, and/or between the face gear portion 116 and the electromagnetic coil 180. The biasing member 182 may extend from the flange portion 162 to the first gear 66. The biasing member 182 may have any suitable configuration. For example, the biasing member 182 may be configured as one or more wave springs that may extend continuously around the input shaft 64. Alternatively, the biasing member 182 may be configured as one or more coil springs that may extend between the first gear 66 and the flange portion 162. The biasing member 182 may be spaced apart from the face gear portion 116 of the first gear 66 and/or the collar face gear 174 such that the biasing member 182 may not interfere with movement of the collar 80. Optionally, a sleeve or spacer may be provided between the biasing member 182 and the face gear portion 116 and/or the collar face gear 174 to inhibit the biasing member 182 from becoming trapped between the face gear portion 116 and the collar face gear 174.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drive axle assembly comprising:
   a housing;
   an input shaft that is disposed in the housing and configured to rotate about an axis;
   a first gear that is disposed proximate the input shaft;
   a collar that is disposed proximate the first gear, wherein the collar has a body portion that defines a hole that receives the input shaft and a flange portion that extends radially from the body portion, wherein the flange portion is ferromagnetic; and
   a collar actuator mechanism that includes an electromagnetic coil that is disposed in a stationary position with respect to the housing, wherein the electromagnetic coil is configured to actuate the collar between a first position in which the collar is disengaged from the first gear and a second position in which the collar engages the first gear.

2. The drive axle assembly of claim 1 wherein the first gear is configured to rotate with respect to the input shaft when the collar is in the first position.

3. The drive axle assembly of claim 1 wherein the first gear does not rotate with respect to the input shaft when the collar is in the second position.

4. The drive axle assembly of claim 1 wherein the electromagnetic coil is configured as a ring that extends continuously around the axis.

5. The drive axle assembly of claim 1 wherein the electromagnetic coil is disposed between the first gear and the collar.

6. The drive axle assembly of claim 1 further comprising a biasing member that is disposed between the input shaft and the electromagnetic coil.

7. The drive axle assembly of claim 1 wherein the body portion has a spline that at least partially defines the hole, wherein the spline mates with a spline on the input shaft to permit axial movement of the collar along the input shaft while inhibiting rotational movement of the collar with respect to the input shaft.

8. The drive axle assembly of claim 1 wherein the collar includes a collar face gear disposed at a first end of the body portion and wherein the flange portion is disposed at a second end of the collar that is disposed opposite the first end.

9. The drive axle assembly of claim 8 wherein the first gear further comprises a face gear portion, wherein the collar face gear disengages the face gear portion when the collar is in the first position and engages the face gear portion when the collar is in the second position.

10. A drive axle assembly comprising:
    a housing;
    an input shaft disposed in the housing and configured to rotate about a first axis;
    an interaxle differential unit that is disposed on the input shaft;
    a first gear that is rotatably disposed on the input shaft and operatively coupled to the interaxle differential unit;
    a collar that is moveably disposed on the input shaft; and
    a collar actuator mechanism that includes:
       an electromagnetic coil disposed in a stationary position on the housing; and
       a biasing member exerts a biasing force that biases the collar away from the first gear;
    wherein the electromagnetic coil is configured to actuate the collar between a first position in which the collar is disengaged from the first gear and a second position in which the collar engages the first gear such that torque is transmitted from the input shaft to the first gear via the collar and wherein the collar is spaced apart from the electromagnetic coil when the collar is in the second position.

11. The drive axle assembly of claim 10 wherein a magnetic attractive force exerted by the electromagnetic coil overcomes the biasing force exerted by the biasing member to actuate the collar from the first position to the second position.

12. The drive axle assembly of claim 10 wherein the biasing member actuates the collar from the second position to the first position when the electromagnetic coil is not energized.

13. The drive axle assembly of claim 10 wherein the biasing member extends continuously around the collar.

14. The drive axle assembly of claim 10 wherein the collar has a collar face gear and the biasing member extends continuously around the collar face gear of the collar and is located between the collar face gear and the electromagnetic coil.

15. The drive axle assembly of claim 10 wherein the collar has a body portion that defines a hole that receives the input shaft and a flange portion that extends radially from the body portion, wherein the biasing member extends from the flange portion to the first gear.

16. The drive axle assembly of claim 10 wherein the biasing member is configured as a wave spring that extends continuously around the input shaft.

17. A drive axle assembly comprising:
a housing;
an input shaft disposed in the housing and configured to rotate about a first axis;
an interaxle differential unit that is disposed on the input shaft;
a first gear that is rotatably disposed on the input shaft and operatively coupled to the interaxle differential unit;
a collar that is moveably disposed on the input shaft; and
a collar actuator mechanism that includes:
an electromagnetic coil disposed in a stationary position on the housing; and
a biasing member exerts a biasing force that biases the collar away from the first gear;
wherein the electromagnetic coil is configured to actuate the collar between a first position in which the collar is disengaged from the first gear and a second position in which the collar engages the first gear such that torque is transmitted from the input shaft to the first gear via the collar and wherein the biasing member is disposed between the input shaft and the electromagnetic coil.

18. The drive axle assembly of claim 17 wherein the collar is spaced apart from the electromagnetic coil when the collar is in the second position.

19. A drive axle assembly comprising:
a housing;
an input shaft disposed in the housing and configured to rotate about a first axis;
an interaxle differential unit that is disposed on the input shaft;
a first gear that is rotatably disposed on the input shaft and operatively coupled to the interaxle differential unit, wherein the first gear includes a face gear portion;
a collar that is moveably disposed on the input shaft; and
a collar actuator mechanism that includes:
an electromagnetic coil disposed in a stationary position on the housing; and
a biasing member exerts a biasing force that biases the collar away from the first gear, wherein the biasing member is disposed between the face gear portion and the electromagnetic coil;
wherein the electromagnetic coil is configured to actuate the collar between a first position in which the collar is disengaged from the first gear and a second position in which the collar engages the first gear such that torque is transmitted from the input shaft to the first gear via the collar.

20. A drive axle assembly comprising:
a housing;
an input shaft disposed in the housing and configured to rotate about a first axis;
an interaxle differential unit that is disposed on the input shaft;
a first gear that is rotatably disposed on the input shaft and operatively coupled to the interaxle differential unit;
a collar that is moveably disposed on the input shaft; and
a collar actuator mechanism that includes:
an electromagnetic coil disposed in a stationary position on the housing; and
a biasing member exerts a biasing force that biases the collar away from the first gear;
wherein the electromagnetic coil is configured to actuate the collar between a first position in which the collar is disengaged from the first gear and a second position in which the collar engages the first gear such that torque is transmitted from the input shaft to the first gear via the collar and wherein the electromagnetic coil has a thickness that extends from a first surface that faces toward the collar to a second surface that is disposed opposite the first surface, wherein the thickness of the electromagnetic coil is less than a distance of travel of the collar from the first position to the second position.

* * * * *